US008635333B2

(12) United States Patent
Kummer

(10) Patent No.: US 8,635,333 B2
(45) Date of Patent: Jan. 21, 2014

(54) METHOD AND SYSTEM FOR ESTIMATING A NUMBER OF USERS OF A WEBSITE BASED ON LOSSY COMPRESSED DATA

(75) Inventor: Olaf Kummer, Halstenbek (DE)

(73) Assignee: CoreMedia AG, Hamburg (DE)

( * ) Notice: Subject to any disclaimer, the term of this patent is extended or adjusted under 35 U.S.C. 154(b) by 718 days.

(21) Appl. No.: 12/746,005

(22) PCT Filed: Nov. 26, 2008

(86) PCT No.: PCT/EP2008/010027
§ 371 (c)(1),
(2), (4) Date: Sep. 21, 2010

(87) PCT Pub. No.: WO2009/071227
PCT Pub. Date: Jun. 11, 2009

(65) Prior Publication Data
US 2011/0022703 A1    Jan. 27, 2011

(30) Foreign Application Priority Data
Dec. 4, 2007   (EP) ...................................... 07023415

(51) Int. Cl.
*G06F 15/173* (2006.01)
(52) U.S. Cl.
USPC ........................................................ 709/224

(58) Field of Classification Search
USPC ........................................................ 709/224
See application file for complete search history.

(56) References Cited

U.S. PATENT DOCUMENTS

| | | | |
|---|---|---|---|
| 2003/0018501 A1 | 1/2003 | Shan |
| 2006/0274763 A1 | 12/2006 | Error |
| 2006/0277197 A1 | 12/2006 | Bailey |

FOREIGN PATENT DOCUMENTS

| | | |
|---|---|---|
| EP | 1 341 089 A2 | 9/2003 |
| JP | 2002 063102 A | 2/2002 |

OTHER PUBLICATIONS

PCT/EP2008/010027, International Search Report and Written Opinion, mail date Jan. 28, 2009.

*Primary Examiner* — Benjamin R Bruckart
*Assistant Examiner* — S M Rahman
(74) *Attorney, Agent, or Firm* — Blakely, Sokoloff, Taylor & Zafman LLP

(57) ABSTRACT

The invention relates to a method and system for estimating a number of users of a website. According to the method, it is repeatedly determined that the website is accessed by an entity and data dependent on the entity is determined and stored. The stored data is repeatedly compressed using a lossy compressing algorithm and based on the compressed data a number of users of the website is estimated.

9 Claims, 5 Drawing Sheets

METHOD AND SYSTEM FOR ESTIMATING A NUMBER OF USERS OF A WEBSITE BASED ON LOSSY COMPRESSED DATA

CROSS-REFERENCE TO RELATED APPLICATIONS

This application is the U.S. national stage entry under 35 U.S.C. §371 of international application PCT/EP2008/010027, filed 26 Nov. 2008, which claims priority to European patent application 07023415.8, filed 4 Dec. 2007. Both applications are hereby incorporated by reference in their entirety.

The present invention relates to a method and system for estimating a number of users of a website.

The number of users of a website is an important parameter to determine the success of the webpage and often has a direct influence on advertising revenues.

From the prior art, methods are known to identify entities that access a webpage. In general, either the IP address of the accessing entity is used or the entity is identified using a cookie. Furthermore, some webpages require that the user logs in by inputting his login name and a password. In this case, the accessing entity can be easily identified via the login.

In this connection it is important to understand that it is nearly impossible to be sure about the user who sends a request having an IP address, who uses a computer on which a cookie is stored, or who logs in at a website. The IP address may be rewritten by a firewall, the computer may be used by more than one person, or somebody may use the login of somebody else. Nevertheless, the identified entities are often used to estimate the number of users of a website because they are considered to be a reasonable proxy for the users.

Once the entity is identified, records are stored that log the access of the entity. At the end of an interval, an analysis tool reads the stored records and counts the number of accessing entities which is deemed to be a good estimation for the number of accessing users.

One problem with this procedure is that till the end of the reporting interval, all the records need to be stored. For small websites, this drawback is acceptable. However, for large websites, the amount of stored data becomes excessive.

To cope with this problem, in the prior art sampling has been proposed. The basic principle of sampling is that only for each x-th (e.g. each $10^{th}$) access an identity of an accessing entity is stored. At the end of the reporting interval, the stored records are analysed and a number of accessing entities is estimated based on the sampled records.

However, this sampling method has the drawback that it is only precise when the number of events, e.g. logged accesses, in the reporting interval is large. However, while long intervals like entire years will typically contain enough events, the same might not be true for hourly or daily intervals.

Furthermore, if the sampling percentage is fixed before the data is sampled, there is the danger that the sample percentage is chosen either too low, leading to inaccuracies, or too high, thereby degrading performance.

Therefore, it is an object of the invention to provide a method and a system for estimating a number of users of a website that are efficient and that allow to estimate the number of users with an acceptable precision.

This object is accomplished by the subject-matter of the independent claims. Preferable embodiments are specified by the dependent claims.

The invention comprises a method for estimating a number of users of a website that comprises the steps of repeatedly determining that the website is accessed by an entity, in reaction to the access of the website, determining data dependent on the entity that accesses the website and storing said data, lossy compressing said stored data, and estimating a number of users of the website based on the compressed stored data.

This means that according to the invention, e.g. data about the identity of accessing entities is stored and said stored data is later on compressed using a lossy compression algorithm. Based on the lossy compressed data, it is possible to estimate a number of users of the website.

This method has the advantage that due to the lossy compression algorithm, less data needs to be stored and analysed. A small loss of precision is acceptable, because the determination of data dependent on the entity is already a source of inaccuracies.

In one preferred embodiment, the method according to the invention comprises the steps of determining a maximum amount of data to be stored, determining a set of numbers, repeatedly mapping the data dependent on the entities that access the website onto a number of the set of numbers according to a mapping function and storing the resulting numbers. According to this embodiment, when the maximum amount of data to be stored is exceeded, the set of numbers is pruned and the stored numbers that correspond to the pruned numbers of the set of numbers are deleted. Later on, a relation between the size of the set of the not-pruned numbers and the size of the set of the pruned numbers is determined, and the number of users of the website is estimated based on the pruned stored data and said relation.

In this way, it is possible to reduce the amount of stored data and to nevertheless estimate the number of users of the website.

In another preferred embodiment, the method comprises the steps of providing an array of bits in a storage, repeatedly mapping the data dependent on the entities that access the website onto one bit of the array of bits according to a mapping function and activating the bit of the array of bits onto which the data was mapped, and estimating the number of users of the website based on the activated bits of the array of bits.

This embodiment has the advantage that it allows to efficiently store data that can be used to estimate a number of users of the website. Preferably, only single bits are set in response to accesses. In this way, the required amount of storage is often lower compared to storing the exact identities of accessing entities as numbers.

Preferably, the method comprises the steps of determining a period of time for which the number of users is to be estimated, dividing the period of time into intervals, providing a plurality of arrays of bits corresponding to the number of intervals, associating each array of bits of the plurality of arrays of bits with one interval, such that for each interval one array of bits is used. In each interval, the bits of the associated array of bits are activated according to the data dependent on the entities that access the website during the interval. In this way, each array of bits allows to estimate the number of users of the website that accessed the website during the associated interval. After the end of the period of time, an array of bits is determined that allows to estimate the number of users of the website that accessed the website during the period of time. This array of bits may be determined by combining the arrays of bits for each interval using a logical OR-operation between the bits of the arrays of bits having the same significance.

This method allows to efficiently store data about entities that have accessed the webpage during each interval and to efficiently combine the stored data for each interval by performing a simple logical OR-operation.

In one embodiment, the mapping function maps the data dependent on the entities that access the website onto a number of the set of numbers or onto one bit of the array of bits based on a uniform distribution. In an alternative embodiment, a non-linear mapping function is employed, such that e.g. the number of data items dependent on the entities that is mapped onto one bit varies in dependence on a magnitude of the data item. This makes the method more scalable in comparison to the usage of a uniform distribution.

In one embodiment of the non-uniform distribution, the mapping function may be composed of two steps: First, data dependent on the accessing entity, e.g. a user identification, is mapped to an integer h using a hash function. Hash functions are described in the prior art that ensure that the resulting integers are evenly distributed between 0 (included) and a constant M (excluded). Afterwards, a non-linear function may be applied to the resulting hash value.

In a preferred embodiment, during the step of estimating the number of users of the website based on the activated bits of the array of bits a maximum likelihood analysis is performed to determine the number of accessing entities that is most likely to reproduce the given pattern of activated bits of the array.

In a preferred embodiment, the step of estimating the numbers of users of the website based on the activated bits of the array of bits may comprise the steps of providing an estimation function relating a number of activated bits with a number of users, determining a number of activated bits by counting the number of activated bits of the array of bits, and estimating the number of users of the website based on the number of activated bits of the array of bits and the estimation function. In this embodiment, the position of an activated bit is irrelevant, such that the estimation can be efficiently performed.

Preferably, as the estimated number of users an integer for which the expected number of activated bits matches the observed number of activated bits most closely is chosen. Because this computation is expensive to perform exactly, a preferred approach is to precompute the expected number of activated bits for certain numbers of users and to use this data for interpolating the actual number of users based on the observed number of activated bits.

Preferably, the data dependent on the entity is an identification of the entity. The method according to the invention may be efficient and may allow to estimate the number of users with an acceptable precision for all interval lengths with a uniform algorithm and potentially without the need to estimate sampling parameters precisely.

Furthermore, the invention comprises a system for estimating a number of users of a website. The system may comprise means for determining that the website is accessed by an entity, means for determining data dependent on the entity that accesses the website, in reaction to the access of the website, means for storing said data, means for lossy compressing said stored data, and means for estimating a number of users of the website based on the compressed stored data.

The system according to the invention may have the same advantages as the corresponding method according to the invention.

In one embodiment, the system comprises means for determining a maximum amount of data to be stored, means for determining a set of numbers, means for repeatedly mapping the data dependent on the entities that access the website onto a number of the set of numbers according to a mapping function, means for storing the resulting numbers, means for pruning the set of numbers and deleting the stored numbers that correspond to the pruned numbers of the set of numbers, when the maximum amount of data to be stored is exceeded, means for determining a relation between the size of the set of the not-pruned numbers and the size of the set of the pruned numbers, and means for estimating the number of users of the website based on the pruned stored data and said relation.

In an alternative embodiment, the system according to the invention comprises a storage storing an array of bits, means for repeatedly mapping the data dependent on the entities that access the website onto one bit of the array of bits according to a mapping function and for activating the bit of the array of bits onto which the data was mapped, and means for estimating the number of users of the website based on the activated bits of the array of bits.

Preferably, the system comprises means for determining a period of time for which the number of users is to be estimated, means for dividing the period of time into intervals, means for providing a plurality of arrays of bits corresponding to the number of intervals, means for associating each array of bits of the plurality of arrays of bits with one interval, such that for each interval one array of bits is used, means for activating in each interval the bits of the associated array of bits according to the data dependent on the entities that access the website during the interval, such that each array of bits allows to estimate the number of users of the website that accessed the website during the associated interval, and means for, after the end of the period of time, determining an array of bits that allows to estimate the number of users of the website that accessed the website during the period of time by combining the arrays of bits for each interval using a logical OR-operation between the bits of the arrays of bits having the same significance.

In one embodiment, the means for repeatedly mapping comprises a mapping function that maps the data dependent on the entity onto a number of the set of numbers or onto one bit of the array of bits based on a uniform distribution. In an alternative embodiment, the means for repeatedly mapping comprises a mapping function that is non-linear, such that the number of data items dependent on the entities that is mapped onto one bit varies in dependence on a magnitude of the data item.

In the case of the non-linear distribution, the mapping function may be composed of two steps: First, data dependent on the accessing entity, e.g. a user identification, is mapped to an integer h using a hash function. Hash functions are described in the prior art that ensure that the resulting integers are evenly distributed between 0 (included) and a constant M (excluded). Afterwards, a non-linear function may be applied to the resulting hash value.

Preferably, the means for estimating the number of users of the website based on the activated bits of the array of bits uses a maximum likelihood analysis to determine the number of accessing entities that is most likely to reproduce the given pattern of activated bits of the array.

In a preferred embodiment, the means for estimating the number of users of the website based on the activated bits of the array of bits comprises an estimation means comprising an estimation function relating a number of activated bits with a number of users, means for determining a number of activated bits by counting the number of activated bits of the array of bits, and means for estimating the number of users of the website based on the number of activated bits of the array of bits and the estimation function.

Preferably, the means for estimating the number of users of the website chooses as the estimated number of users an integer for which the expected number of activated bits matches the observed number of activated bits most closely. Because this computation is expensive to perform exactly, a preferred approach is to precompute the expected number of activated bits for certain numbers of users and to use this data for interpolating the actual number of users based on the observed number of activated bits.

Preferably, the data dependent on the entity is an identification of the entity.

The method and the system according to the invention may be implemented using software. Accordingly, the invention comprises a computer program product that comprises a computer readable medium and a computer program recorded therein in form of a series of state elements corresponding to instructions which are adapted to be processed by a data processing means of a data processing apparatus such that a method according to the invention is performed or a system according to the invention is formed on the data processing means.

Preferred embodiments and further details of the present invention will be explained in the following with reference to the figures.

Figure 1:
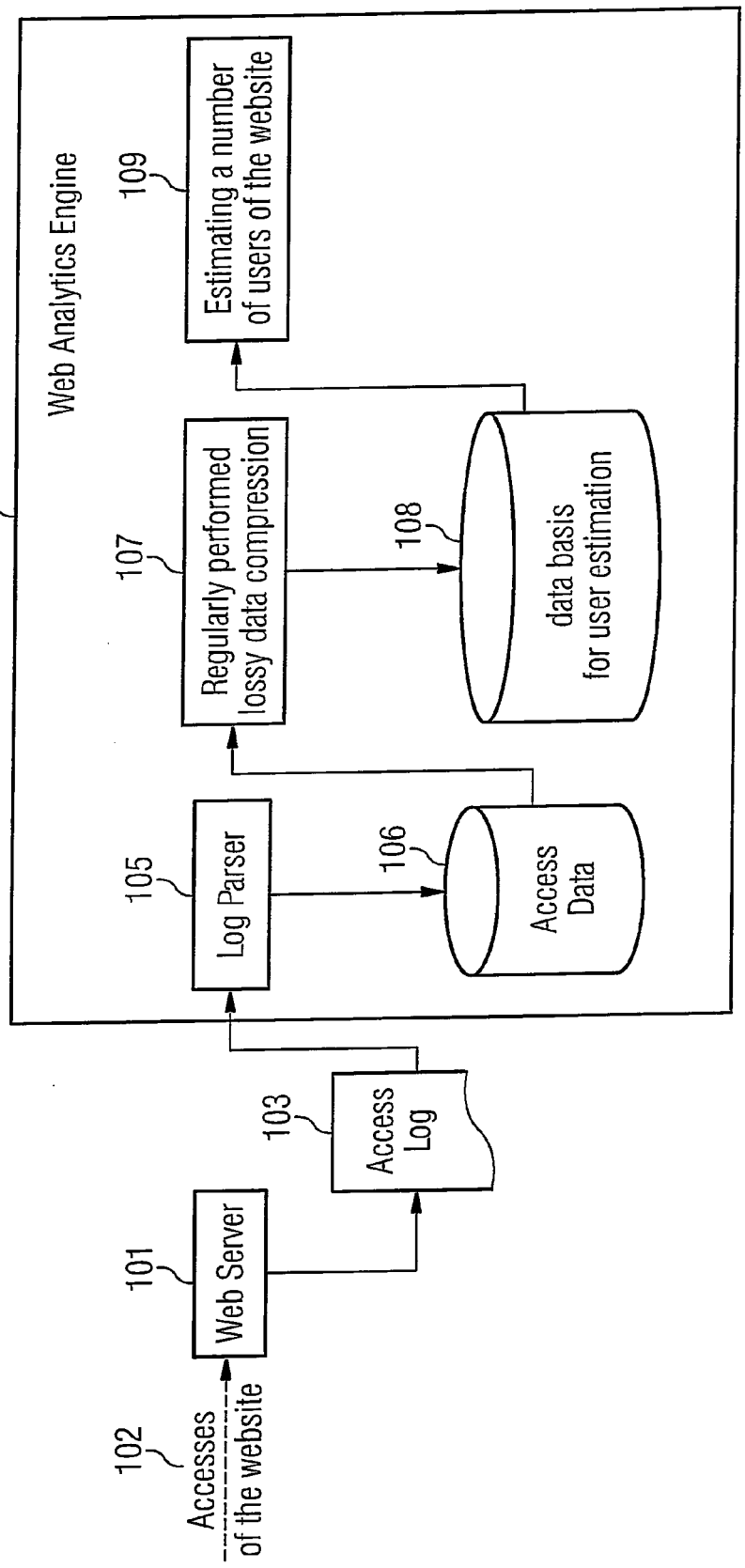
FIG. 1 shows one embodiment of a system for estimating a number of users of a website.

FIG. 1 shows one embodiment of a system according to the present invention. A web server 101 receives accesses of the website 102 and generates based on the accesses an access log 103. The access log is analysed by a web analytics engine 104. The web analytics engine 104 comprises a log parser 105 that parses the access log 103 and generates access data that is stored in a data base 106. The access data 106 is regularly compressed using a lossy compression algorithm. A means for lossy compressing the data 107 generates a data basis 108 for the estimation of a number of users of the website. Based on this data basis, a number of users of the website is estimated 109.

Figure 2:
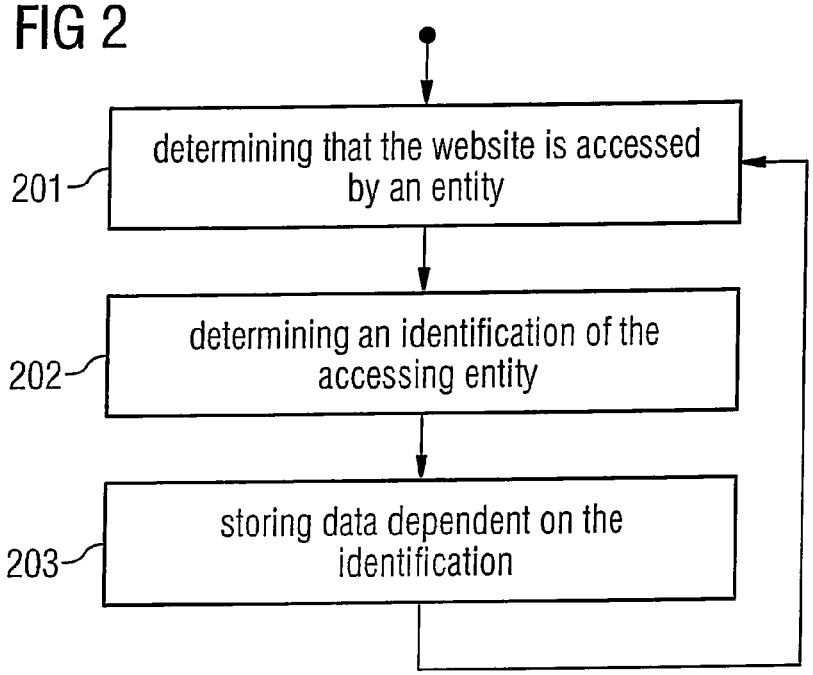
FIG. 2 shows a process that generates access data according to one embodiment of the present invention.

FIG. 2 shows a process that generates access data 106 that may be used in one embodiment of the method according to the present invention. In step 201, it is determined that the website is accessed by an entity. In step 202, an identification of the entity that accesses the website is determined. In step 203, data dependent on the identification of the entity is stored and the process resumes with step 201.

Figure 3:
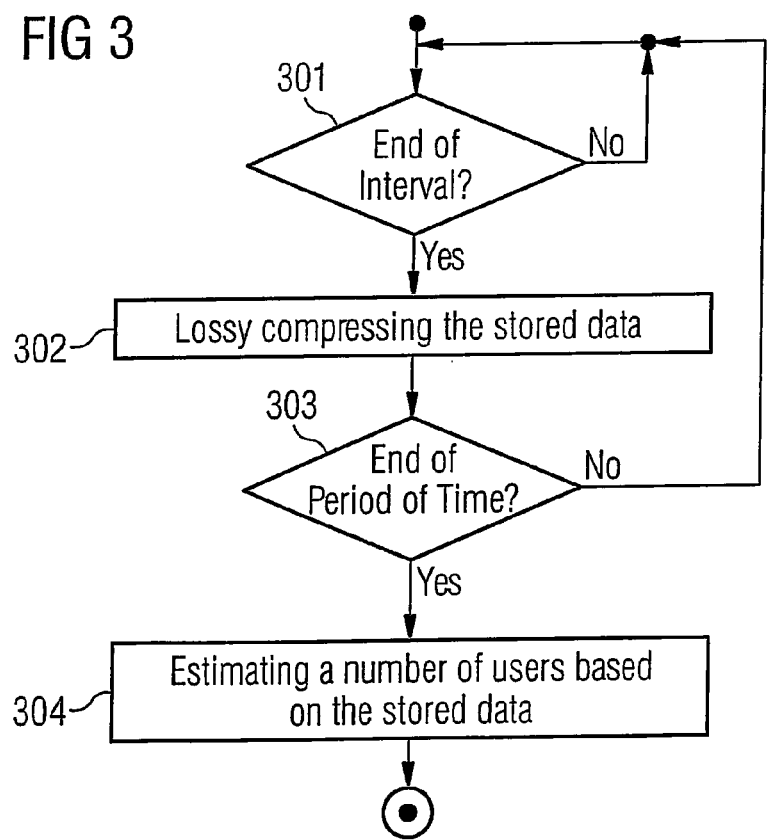
FIG. 3 shows one embodiment of a data compression and user estimation process according to the invention.

FIG. 3 shows one embodiment of a lossy compression procedure in combination with a user estimation step according to the present invention. In step 301, the procedure checks whether the end of an interval for which the accessing entities are logged is reached. If the end of the interval is reached, the stored data is lossy compressed in step 302. Step 303 checks whether the end of the period of time is reached. In other words, it is checked whether another interval follows. If this is the case, the process resumes with step 301. If the end of the period of time is reached, a number of users is estimated in step 304 based on the stored data.

Figure 4:
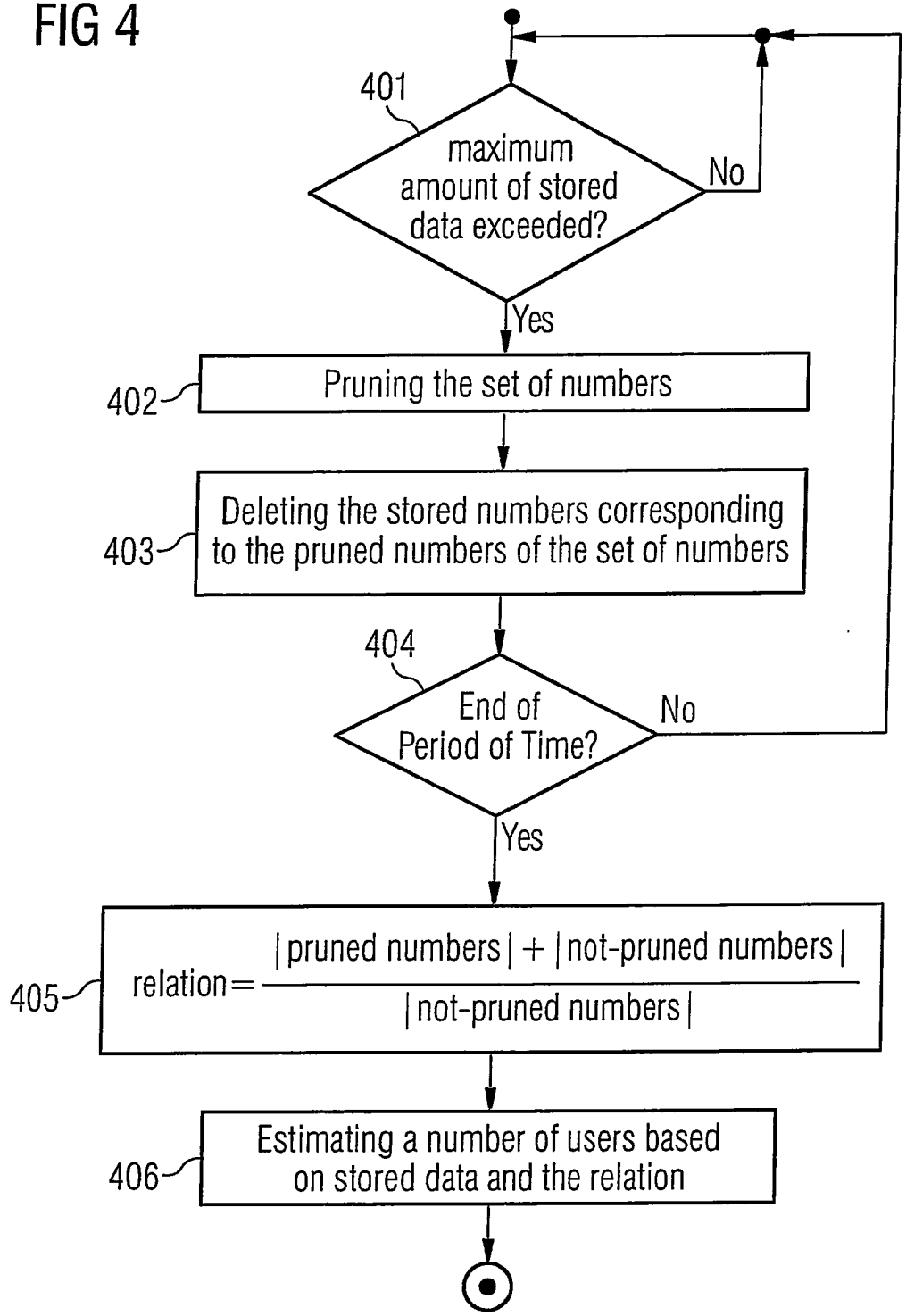
FIG. 4 shows another embodiment of a data compression and user estimation process according to the invention.

FIG. 4 shows a data compression and user estimation procedure according to one embodiment of the method according to the invention. It is assumed that a process is running that continuously generates access data like e.g. the process shown in FIG. 2. In step 401, it is checked whether the maximum amount of stored data is exceeded. If this is the case, the set of numbers is pruned in step 402 and the stored numbers that correspond to the pruned numbers of the set of numbers are deleted in step 403. Afterwards, it is checked whether the end of the period of time is reached in step 404. If the end of the period of time is not reached, the procedure resumes with step 401. If the end of the period of time is reached, a relation is determined. As shown in step 405, the relation may be for example the size of the set of the pruned numbers plus the size of the set of the not-pruned numbers, i.e. the overall size of the set of numbers at the beginning, divided by the size of the set of the not-pruned numbers. Based on this relation and the stored data, a number of users of the website is estimated in step 406.

The following example further illustrates this procedure. It is assumed that the maximum amount of data to be stored is set to be 5, while the set of numbers on which the identifications of the entities are mapped are the numbers between 0 and 99. It is assumed that in a first interval, data is stored that indicates that the entities 1, 12, 17, 19, 33, 43, 67, 82, 83, 92 accessed the webpage in the interval 1. Since the amount of stored data exceeds 5, the lower half of the set of numbers is pruned. The numbers 67, 82, 83, and 92 remain.

In the interval 2, the entities 1, 3, 72, and 73 access the webpage. The numbers 72 and 73 are stored, such that the entities 67, 72, 73, 82, 83, and 92 are stored. This again exceeds the maximum amount of data to be stored such that the third quarter of the set of numbers is pruned, i.e. the numbers from 50 to 74. The numbers 82, 83, and 92 remain. These are three entities. It is known that only one quarter of the complete set of numbers remains. Therefore, the numbers of accessing entities is multiplied with 4 to estimate the number of users that accessed the webpage. 3 times 4 yields 12. The exact number of accessing entities was 14. This means that the described procedure provides an acceptable estimation for the actual number of users of the website, while using only a fraction of the storage that would be necessary to store the identities of all accessing entities.

In this example, the maximum amount of data was chosen to be 5 to provide a concise example. In practice, values of 10000 or more will lead to better precision without increasing the memory demand unduely.

According to a further embodiment, it is possible to aggregate access data on multiple scales at the same time. For example, it may be necessary to prepare daily, weekly, and yearly statistics. In that case, the amounts of pruning applied on the different scales may vary. Especially the shorter intervals will normally be pruned less. If existing data from shorter intervals is combined into a larger interval, the combined data set must be pruned at least as strongly as the most pruned interval.

Figure 5:
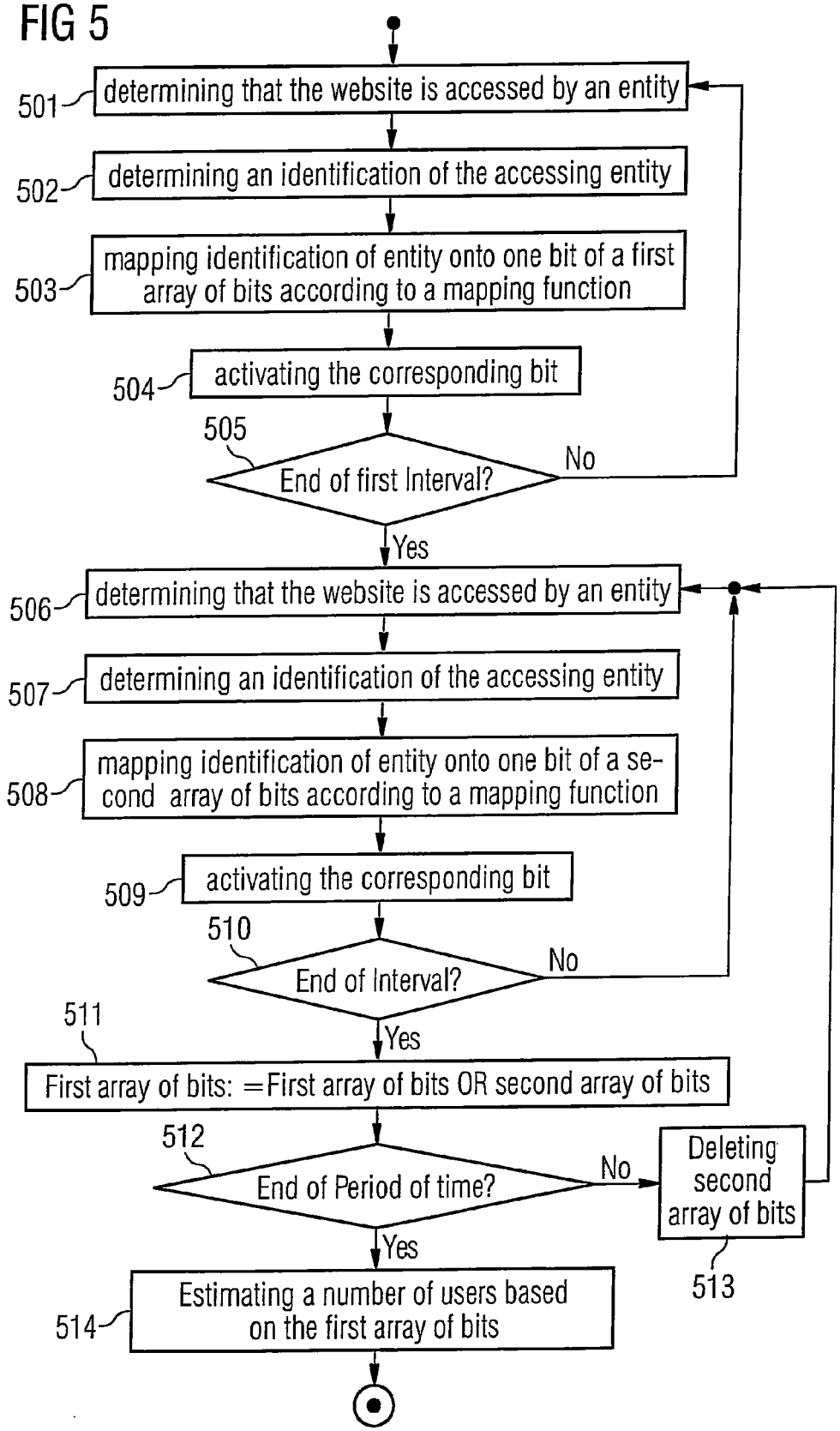
FIG. 5 shows an embodiment of the method according to the invention.

FIG. 5 shows another embodiment of the method according to the present invention. In step 501, it is determined that the website is accessed by an entity. In step 502, an identification of the entity that accesses the website is determined. The identification of the entity is then mapped onto one bit of a first array of bits according to a mapping function in step 503. The bit of the array of bits onto which the identification was mapped is activated accordingly (step 504).

In a preferred embodiment, the following mapping function H(x) is used:

$$H(x) = -K \ln \frac{x+C}{M+C}$$

x denotes the hashcode derived from an accessing entity. It is characterized by a number taken from an interval from 0 to M−1, e.g. by a 64-bit-value if $M=2^{64}$. For each interval, an array of bits having S bits is provided. The larger S is chosen, the higher is the precision of the generated statistics. Reasonable values for S lie around 1 million. The mapping function H(x) maps each entity onto a value between 0 and S−1. The mapping function possesses the property that some values are chosen more often than others, i.e. the mapping function is non-linear. C and K are constants that can be derived from the expected maximal value E of the statistical parameter to be examined and the values of S and M:

$$C = \frac{M}{E-1} \quad K = \frac{S}{\ln E}$$

With this mapping function for each entity a hash bucket H(x) is calculated and the corresponding bit is set in the array of bits. For combining the arrays of bits of the intervals, the arrays of bits can be simply combined using a logical OR-operation.

In another preferable embodiment of the mapping function, C for the mapping function H(x) is calculated as:

$$C = \frac{S}{E \cdot \ln\left(\frac{1}{C}\right)}$$

For determining C, a fixed point must be calculated that can be estimated for example with $$C = \frac{S}{E \cdot \ln\left(\frac{E}{S}\right)}$$

Then, K is set as follows:

$$K = \frac{S}{\ln\left(\frac{M+C}{C}\right)}$$

In this embodiment, the parameter x must be uniformly distributed. Techniques for calculating x from an identification of an entity are known, for example a cryptographic hash function can be used, but also simpler hash functions will normally give satisfactory results.

The described mapping function exhibits in a wide range a scale-invariant quality of the estimation, if E is chosen sufficiently high. Even if E is orders of magnitude too high, the resulting precision will degrade only moderately.

In step 505 shown in FIG. 5, it is determined whether the end of the first interval is reached. If this is not the case, the procedure resumes with step 501. Otherwise, the procedure proceeds to step 506, in which it is determined again that the website is accessed by an entity. In step 507, an identification of the accessing entity is determined, and in step 508, this identification of the entity is mapped onto one bit of a second array of bits according to the above described mapping function. The corresponding bit of the second array of bits is activated accordingly in step 509. In step 510, it is determined whether the end of the second interval is reached. If the end is not reached yet, the procedure resumes with step 506. Otherwise, the procedure proceeds to step 511, in which the first array of bits and the second array of bits are combined using a logical OR-operation, wherein the result is written into the first array of bits. This means that after step 511, the first array of bits indicates the identifications of the entities that have accessed the website during the first and the second interval.

Afterwards, it is checked whether the end of the period of time has been reached in step 512. If there are further intervals, the procedure proceeds to step 513, where the second array of bits is deleted. Then, the procedure jumps back to step 506. If the end of the period of time is reached in step 512, the procedure proceeds to step 514 in which the number of the users of the website is estimated based on the first array of bits.

Figure 6:
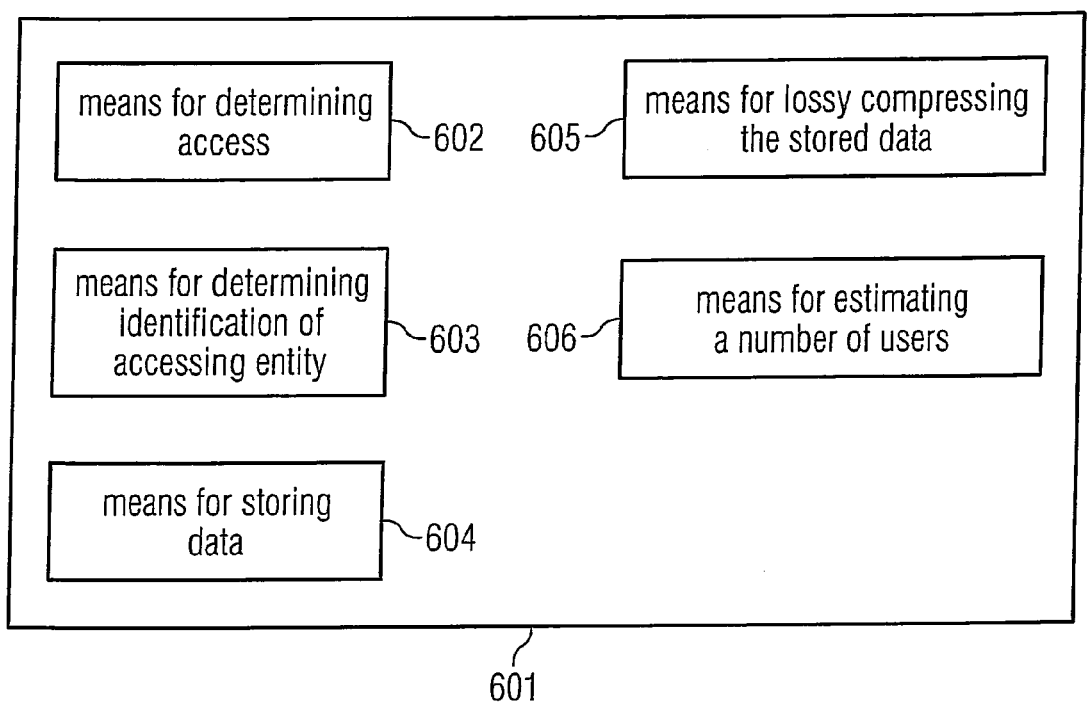
FIG. 6 shows an embodiment of the system according to the present invention.

FIG. 6 shows one embodiment of a system according to the invention. The system for estimating a number of users of a website 601 comprises means for determining that the website is accessed by an entity 602, means for determining an identification of the entity that accesses the web site 603, means for storing data dependent on the identification of the entity 604, means for lossy compressing the stored data 605, and means for estimating a number of users of the website based on the stored data 606.

The specifications and drawings are to be regarded in an illustrative rather than a restrictive sense. It is evident that various modifications and changes may be made thereto, without departing from the scope of the invention as set forth in the claims. It is possible to combine the features described in the embodiments in a modified way for providing additional embodiments that are optimized for a certain usage scenario. As far as such modifications are readily apparent for a person skilled in the art, these modifications shall be regarded as implicitly disclosed by the above described embodiments.

The invention claimed is:

1. A method for estimating a number of accessing entities which are accessing a website, the method comprising:
    dividing a period of time for which the number of accessing entities is to be estimated into a plurality of time intervals;
    providing a plurality of arrays of bits, the number of the arrays of bits corresponding to the number of time intervals and each array of bits having a number of S bits;
    associating each array of bits with one of the plurality of time intervals, respectively;
    repeatedly determining that the website is accessed by an accessing entity during each of the plurality of time intervals;
    determining, in reaction to each access of the website by an accessing entity during a current time interval of the plurality of time intervals, identification data comprising a characterizing number x dependent on the accessing entity, each accessing entity being characterized by a characterizing number x taken from the interval 0 to M−1;
    calculating, in reaction to each access of the website by an accessing entity during a current time interval of the plurality of time intervals, a hash bucket H(x) for the accessing entity by mapping the characterizing number x dependent on the accessing entity onto a value between 0 and S−1 according to a non-linear mapping function H(x);
    activating, in reaction to each access of the website by an accessing entity during a current time interval of the plurality of time intervals, the bit corresponding to the determined hash bucket H(x) for the accessing entity in the array of bits corresponding to the current time interval;

determining, after the end of the period of time, a combined array of bits by combining the plurality of arrays of bits associated with the plurality of time intervals by using a logical OR-operation between the bits of the arrays of bits having the same significance; and estimating the number of accessing entities of the website which accessed the website during the period of time based on the activated bits of the combined array of bits.

2. The method of claim 1 wherein estimating the number of accessing entities of the website based on the activated bits of the combined array of bits uses a maximum likelihood analysis which is based on a pattern of the activated bits of the combined array of bits.

3. The method of claim 1 wherein estimating the number of accessing entities of the website based on the activated bits of the combined array of bits comprises:

providing an estimation function relating a number of activated bits of the combined array of bits with a number of accessing entities;

determining a number of activated bits by counting the number of activated bits of the combined array of bits; and estimating the number of accessing entities of the website based on the number of activated bits of the array of bits according to a relation given by the estimation function.

4. A system for estimating a number of accessing entities which are accessing a website, the system comprising a data processing apparatus adapted to execute:

dividing a period of time for which the number of accessing entities is to be estimated into a plurality of time intervals;

providing a plurality of arrays of bits, the number of the arrays of bits corresponding to the number of time intervals and each array of bits having a number of S bits;

associating each array of bits with one of the plurality of time intervals, respectively;

repeatedly determining that the website is accessed by an accessing entity during each of the plurality of time intervals, determining, in reaction to each access of the website by an accessing entity during a current time interval of the plurality of time intervals, identification data comprising a characterizing number x dependent on the accessing entity, each accessing entity being characterized by a characterizing number x taken from the interval 0 to M−1;

calculating, in reaction to each access of the website by an accessing entity during a current time interval of the plurality of time intervals, a hash bucket H(x) for the accessing entity by mapping the characterizing number x dependent on the accessing entity onto a value between 0 and S−1 according to a non-linear mapping function H(x);

activating, in reaction to each access of the website by an accessing entity during a current time interval of the plurality of time intervals, the bit corresponding to the determined hash bucket H(x) for the accessing entity in the array of bits corresponding to the current time interval;

determining, after the end of the period of time, a combined array of bits by combining the plurality of arrays of bits associated with the plurality of time intervals by using a logical OR-operation between the bits of the arrays of bits having the same significance; and estimating the number of accessing entities of the website which accessed the website during the period of time based on the activated bits of the combined array of bits.

5. The system of claim 4 wherein, when estimating the number of accessing entities of the website based on the activated bits of the combined array of bits, the data processing apparatus is adapted to use a maximum likelihood analysis which is based on a pattern of the activated bits of the combined array of bits.

6. The system of claim 4 wherein, when estimating the number of accessing entities of the website based on the activated bits of the combined array of bits, the data processing apparatus is adapted to execute:

providing an estimation function relating a number of activated bits of the combined array of bits with a number of accessing entities, determining a number of activated bits by counting the number of activated bits of the combined array of bits, and estimating the number of accessing entities of the website based on the number of activated bits of the combined array of bits according to a relation given by the estimation function.

7. A non-transitory computer readable medium having a computer program recorded therein, the computer program comprising a set of instructions which, when executed by a data processing apparatus, cause the data processing apparatus to:

divide a period of time for which the number of accessing entities is to be estimated into a plurality of time intervals;

provide a plurality of arrays of bits, the number of the arrays of bits corresponding to the number of time intervals and each array of bits having a number of S bits;

associate each array of bits with one of the plurality of time intervals, respectively;

repeatedly determine that the website is accessed by an accessing entity during each of the plurality of time intervals, determine, in reaction to each access of the website by an accessing entity during a current time interval of the plurality of time intervals, identification data comprising a characterizing number x dependent on the accessing entity, each accessing entity being characterized by a characterizing number x taken from the interval 0 to M−1;

calculate, in reaction to each access of the website by an accessing entity during a current time interval of the plurality of time intervals, a hash bucket H(x) for the accessing entity by mapping the characterizing number x dependent on the accessing entity onto a value between 0 and S−1 according to a non-linear mapping function H(x);

activate, in reaction to each access of the website by an accessing entity during a current time interval of the plurality of time intervals, the bit corresponding to the determined hash bucket H(x) for the accessing entity in the array of bits corresponding to the current time interval;

determine, after the end of the period of time, a combined array of bits by combining the plurality of arrays of bits associated with the plurality of time intervals by using a logical OR-operation between the bits of the arrays of bits having the same significance; and estimate the number of accessing entities of the website which accessed the website during the period of time based on the activated bits of the combined array of bits.

8. The non-transitory computer readable medium of claim 7 wherein the instructions to estimate the number of accessing entities of the website based on the activated bits of the combined array of bits uses a maximum likelihood analysis which is based on a pattern of the activated bits of the combined array of bits.

9. The non-transitory computer readable medium of claim 7 wherein the instructions to estimate the number of accessing entities of the website based on the activated bits of the combined array of bits comprise instructions to:
- provide an estimation function relating a number of activated bits of the combined array of bits with a number of accessing entities;
- determine a number of activated bits by counting the number of activated bits of the combined array of bits; and
- estimate the number of accessing entities of the website based on the number of activated bits of the combined array of bits according to a relation given by the estimation function.

* * * * *